(12) United States Patent
Stewart et al.

(10) Patent No.: US 12,646,329 B2
(45) Date of Patent: *Jun. 2, 2026

(54) SYSTEMS AND METHODS FOR OBJECT DETECTION IN AN ENVIRONMENT

(71) Applicant: Sensormatic Electronics, LLC, Boca Raton, FL (US)

(72) Inventors: Michael C. Stewart, Delray Beach, FL (US); Natasha Mishell Astudillo, Pembroke Pines, FL (US); Harsh Gaurangbhai Motka, Surendranagar (IN); Joseph Celi, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/886,611

(22) Filed: Sep. 16, 2024

(65) Prior Publication Data

US 2025/0014352 A1 Jan. 9, 2025

Related U.S. Application Data

(63) Continuation of application No. 17/580,023, filed on Jan. 20, 2022, now Pat. No. 12,118,796.

(51) Int. Cl.
*G06V 20/52* (2022.01)
*G06T 7/00* (2017.01)

(52) U.S. Cl.
CPC ................ *G06V 20/53* (2022.01); *G06T 7/97* (2017.01); *G06T 2207/30242* (2013.01)

(58) Field of Classification Search
CPC ........ G06V 20/53; G06V 10/98; G06V 40/10; G06V 20/52; G06T 7/97; G06T 2207/30242
See application file for complete search history.

(56) References Cited

U.S. PATENT DOCUMENTS

| | | | |
|---|---|---|---|
| 7,692,684 | B2 | 4/2010 | Ku et al. |
| 10,134,151 | B2 | 11/2018 | Liu et al. |

(Continued)

FOREIGN PATENT DOCUMENTS

| | | |
|---|---|---|
| KR | 20210088075 A | 7/2021 |

OTHER PUBLICATIONS

International Search Report and Written Opinion for International Patent Application No. PCT/US2023/060424, mailed May 10, 2023, 17 pages.

(Continued)

*Primary Examiner* — Kent Yip

(74) *Attorney, Agent, or Firm* — ArentFox Schiff LLP

(57) ABSTRACT

Aspects of the present disclosure relate generally to a vision system that detects objects moving in an environment. The vision system detects objects that crossed a boundary of an environment during a first period of time, and determines a count of objects that crossed the boundary in a first direction. The vision system retrieves historical egress and ingress data for a second period of time corresponding to the first period of time. The historical egress and ingress data comprises a detected historic count of crossings in the first direction and a corrected historic count of crossings in the first direction. The vision system calculates an error rate for the second period of time based on a ratio of the detected historic count and the corrected historic count, and determines a corrected count for the first period of time by adjusting the count using the error rate.

20 Claims, 9 Drawing Sheets

(56)  References Cited

U.S. PATENT DOCUMENTS

| 2019/0236376 | A1 |   | 8/2019  | Sakashita et al. |            |
|---------------|-----|---|---------|------------------|------------|
| 2021/0374426 | A1 |   | 12/2021 | Park et al.      |            |
| 2022/0292286 | A1 | * | 9/2022  | Subramanian      | G06T 7/277 |

OTHER PUBLICATIONS

Invitation to Pay Additional Fees and, Where Applicable, Protest Fee in PCT/US2023/060424, mailed Mar. 16, 2023, 11 pages.

* cited by examiner

400

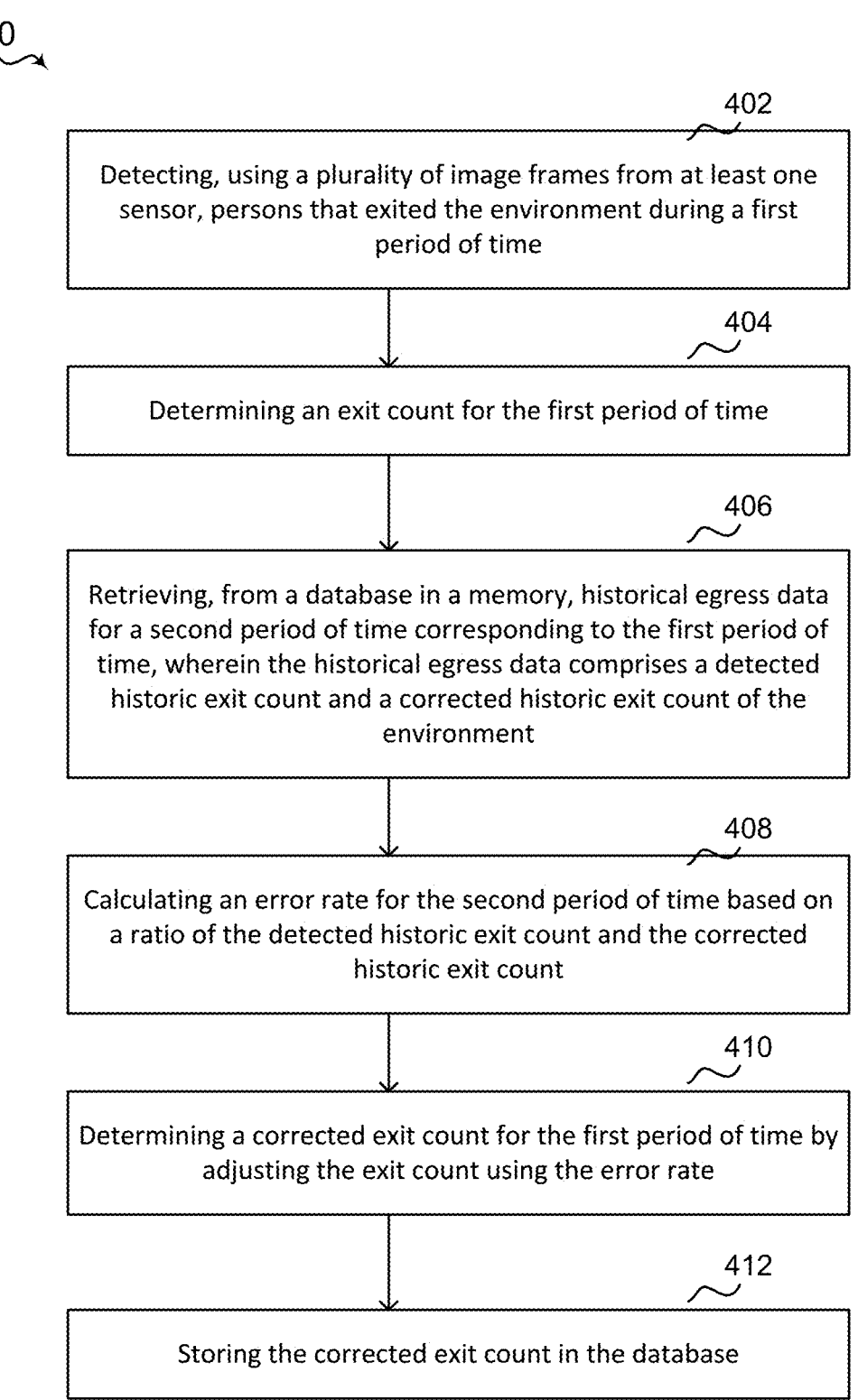

402

Detecting, using a plurality of image frames from at least one sensor, persons that exited the environment during a first period of time

404

Determining an exit count for the first period of time

406

Retrieving, from a database in a memory, historical egress data for a second period of time corresponding to the first period of time, wherein the historical egress data comprises a detected historic exit count and a corrected historic exit count of the environment

408

Calculating an error rate for the second period of time based on a ratio of the detected historic exit count and the corrected historic exit count

410

Determining a corrected exit count for the first period of time by adjusting the exit count using the error rate

412

Storing the corrected exit count in the database

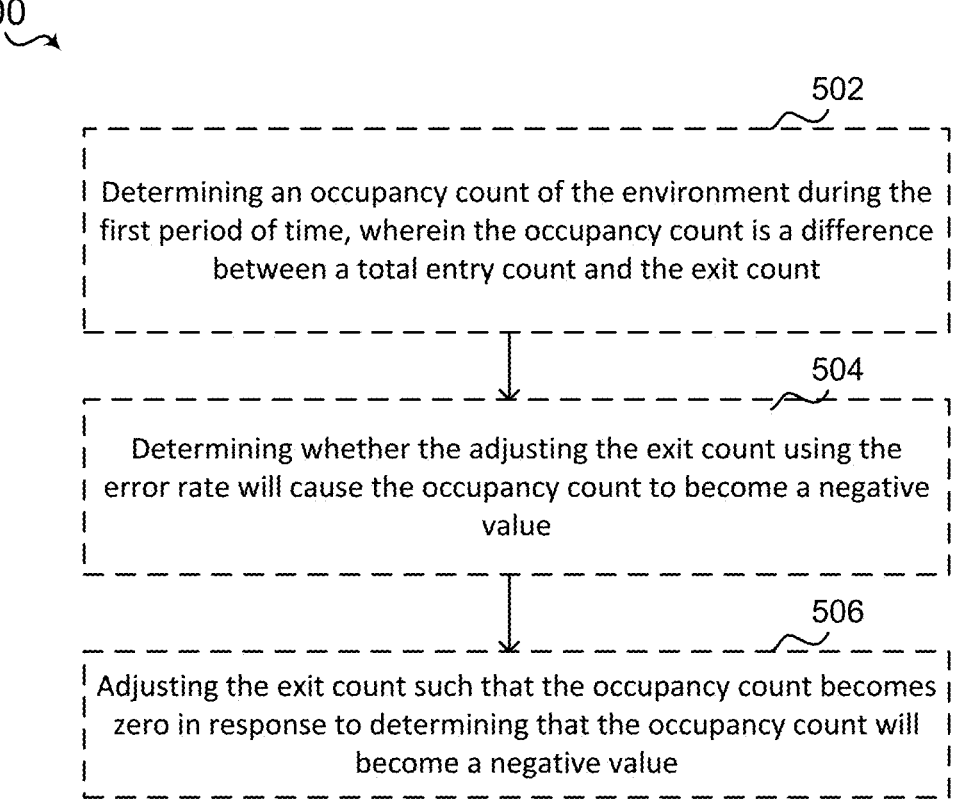

502

Determining an occupancy count of the environment during the first period of time, wherein the occupancy count is a difference between a total entry count and the exit count

504

Determining whether the adjusting the exit count using the error rate will cause the occupancy count to become a negative value

506

Adjusting the exit count such that the occupancy count becomes zero in response to determining that the occupancy count will become a negative value

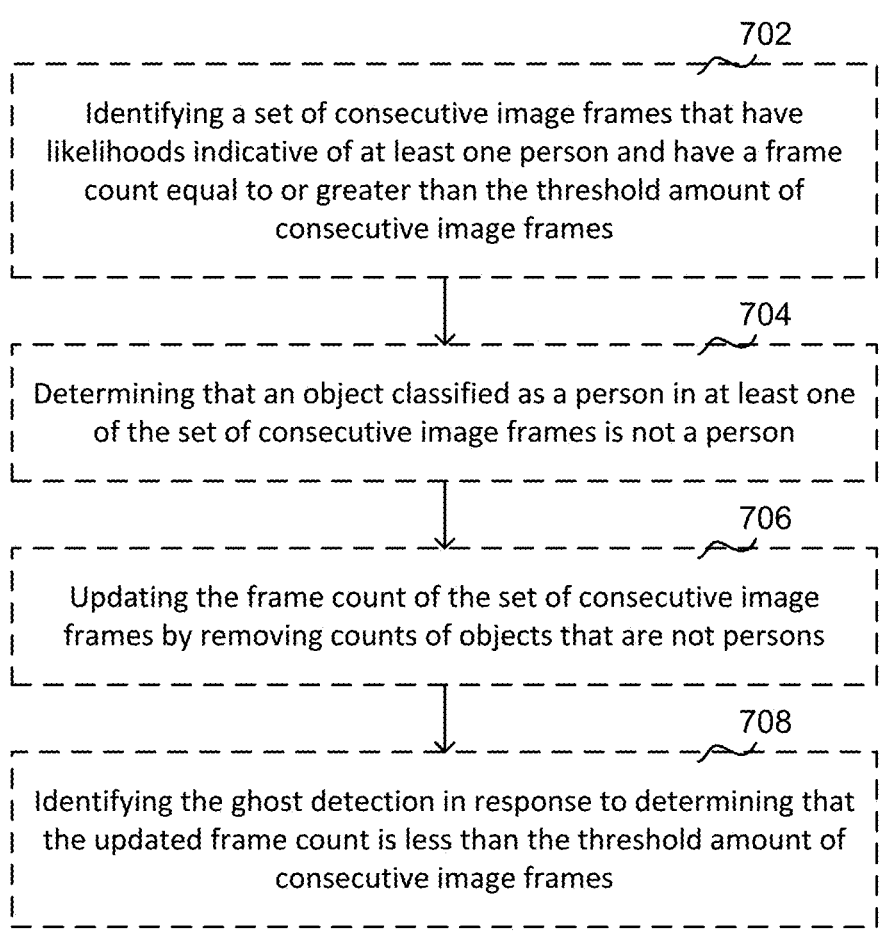

702

Identifying a set of consecutive image frames that have likelihoods indicative of at least one person and have a frame count equal to or greater than the threshold amount of consecutive image frames

704

Determining that an object classified as a person in at least one of the set of consecutive image frames is not a person

706

Updating the frame count of the set of consecutive image frames by removing counts of objects that are not persons

708

Identifying the ghost detection in response to determining that the updated frame count is less than the threshold amount of consecutive image frames

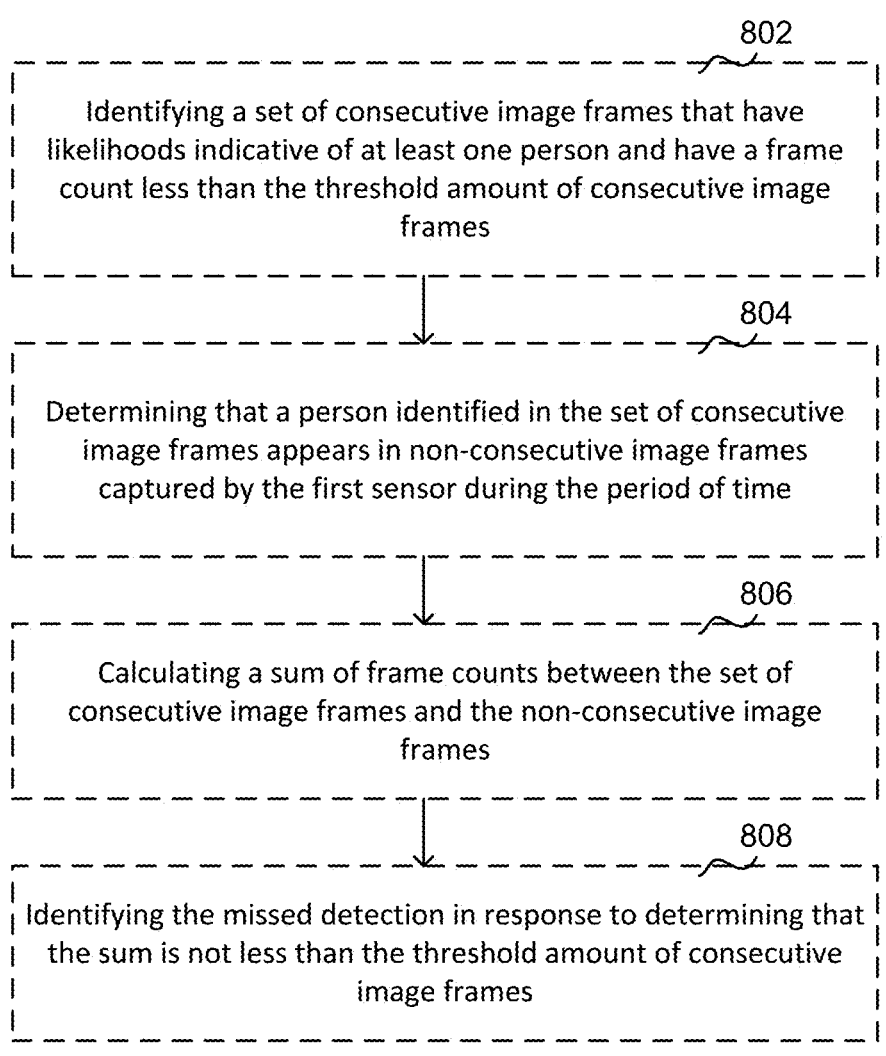

802

Identifying a set of consecutive image frames that have
likelihoods indicative of at least one person and have a frame
count less than the threshold amount of consecutive image
frames

804

Determining that a person identified in the set of consecutive
image frames appears in non-consecutive image frames
captured by the first sensor during the period of time

806

Calculating a sum of frame counts between the set of
consecutive image frames and the non-consecutive image
frames

808

Identifying the missed detection in response to determining that
the sum is not less than the threshold amount of consecutive
image frames

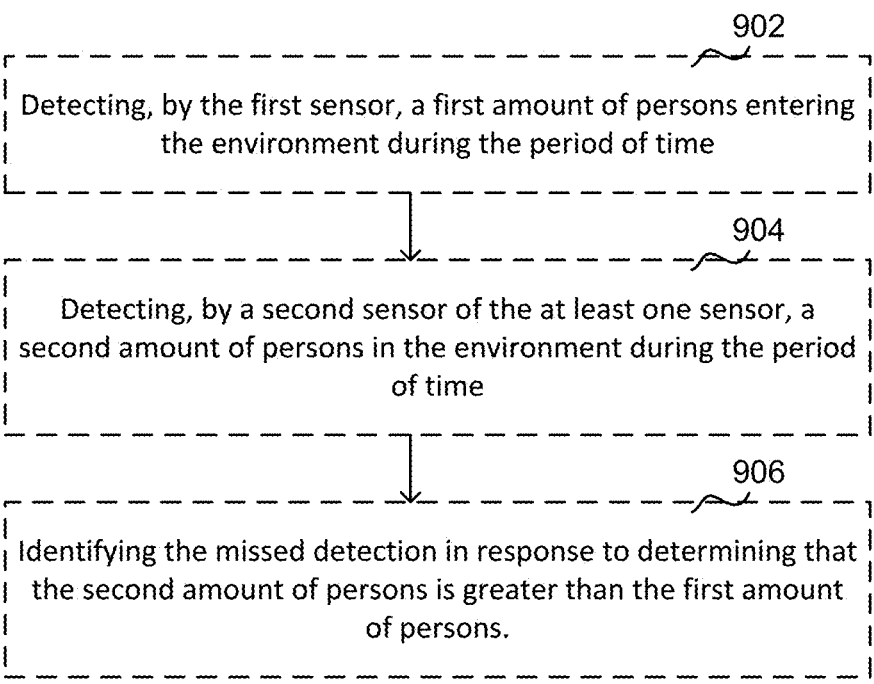

902

Detecting, by the first sensor, a first amount of persons entering the environment during the period of time

904

Detecting, by a second sensor of the at least one sensor, a second amount of persons in the environment during the period of time

906

Identifying the missed detection in response to determining that the second amount of persons is greater than the first amount of persons.

Fig. 9

SYSTEMS AND METHODS FOR OBJECT DETECTION IN AN ENVIRONMENT

CROSS-REFERENCE TO RELATED APPLICATIONS

This application is a continuation of U.S. Non-Provisional application Ser. No. 17/580,023, filed Jan. 20, 2022, which is herein incorporated by reference.

TECHNICAL FIELD

The described aspects relate to security systems that comprise object detection features.

BACKGROUND

Aspects of the present disclosure relate generally to vision systems that may be used for security, and more particularly to object detection.

Vision systems may be used to detect objects, such as people, in an environment. In some implementations, for example, vision systems may be used for determining occupancy counts, which is important for fields such as security, marketing, and health. For example, a user of a security system may be interested in knowing how many people have entered/exited a theater with a fire code occupancy limit. An owner of a shopping mall may be interested in knowing how many people enter different stores to evaluate popularity. Office personnel may be interested in knowing how many people have entered an office to enforce health-based regulations (e.g., limit the occupancy count to prevent the spread of a virus).

Conventional systems, however, often fail to provide accurate detection and/or counts due to sub-par detection algorithms, aging/corrupted hardware, and different exit/entry scenarios (e.g., visual/physical obstacles, unorthodox entry/exit movement by people, etc.). Accordingly, there exists a need for improvements in such vision systems with object detection/counting capabilities.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for detecting persons exiting an environment, comprising detecting, by a processor using a plurality of image frames from at least one sensor, persons that exited the environment during a first period of time. The method further includes determining, by the processor, an exit count for the first period of time. Additionally, the method further includes retrieving, by the processor from a database in a memory, historical egress data for a second period of time corresponding to the first period of time, wherein the historical egress data comprises a detected historic exit count and a corrected historic exit count of the environment. Additionally, the method further includes calculating, by the processor, an error rate for the second period of time based on a ratio of the detected historic exit count and the corrected historic exit count.

Additionally, the method further includes determining, by the processor, a corrected exit count for the first period of time by adjusting the exit count using the error rate. Additionally, the method further includes storing, by the processor, the corrected exit count in the database.

Another example implementation includes an apparatus for detecting persons exiting an environment, comprising a memory and a processor in communication with the memory. The processor is configured to detect, using a plurality of image frames from at least one sensor, persons that exited the environment during a first period of time. The processor is further configured to determine an exit count for the first period of time. Additionally, the processor further configured to retrieve, from a database in a memory, historical egress data for a second period of time corresponding to the first period of time, wherein the historical egress data comprises a detected historic exit count and a corrected historic exit count of the environment. Additionally, the processor further configured to calculate an error rate for the second period of time based on a ratio of the detected historic exit count and the corrected historic exit count. Additionally, the processor further configured to determine a corrected exit count for the first period of time by adjusting the exit count using the error rate. Additionally, the processor further configured to store the corrected exit count in the database.

Another example implementation includes an apparatus for detecting persons exiting an environment, comprising means for detecting, using a plurality of image frames from at least one sensor, persons that exited the environment during a first period of time. The apparatus further includes means for determining an exit count for the first period of time. Additionally, the apparatus further includes means for retrieving, from a database in a memory, historical egress data for a second period of time corresponding to the first period of time, wherein the historical egress data comprises a detected historic exit count and a corrected historic exit count of the environment. Additionally, the apparatus further includes means for calculating an error rate for the second period of time based on a ratio of the detected historic exit count and the corrected historic exit count. Additionally, the apparatus further includes means for determining a corrected exit count for the first period of time by adjusting the exit count using the error rate. Additionally, the apparatus further includes means for storing the corrected exit count in the database.

Another example implementation includes a computer-readable medium storing instructions for detecting persons exiting an environment, executable by a processor to detect a plurality of image frames from at least one sensor, persons that exited the environment during a first period of time. The instructions are further executable to determine an exit count for the first period of time. Additionally, the instructions are further executable to retrieve, from a database in a memory, historical egress data for a second period of time corresponding to the first period of time, wherein the historical egress data comprises a detected historic exit count and a corrected historic exit count of the environment. Additionally, the instructions are further executable to calculate an error rate for the second period of time based on a ratio of the detected historic exit count and the corrected historic exit count. Additionally, the instructions are further executable to determine a corrected exit count for the first period of time by adjusting the exit count using the error rate. Additionally, the instructions are further executable to store the corrected exit count in the database.

An example implementation includes a method for detecting persons entering an environment, comprising detecting, by a processor using a plurality of image frames from a first sensor, persons that enter the environment during a period of time by: identifying objects in the plurality of image frames captured by the first sensor during the period of time; and determining, for each respective object, a likelihood that the respective object is a person, wherein a likelihood greater than a threshold likelihood is indicative of a person detection. Additionally, the method further includes incrementing, by the processor, an entry count of the period of time for each distinct person detected. Additionally, the method further includes determining, by the processor, a corrected entry count for the period of time by, without manual input from a user, removing ghost detection counts and adding missed detection counts. Additionally, the method further includes storing, by the processor, the corrected entry count in a database.

Another example implementation includes an apparatus for detecting persons entering an environment, comprising a memory and a processor in communication with the memory. The processor is configured to detect, using a plurality of image frames from a first sensor, persons that enter the environment during a period of time by: identifying objects in the plurality of image frames captured by the first sensor during the period of time; and determining, for each respective object, a likelihood that the respective object is a person, wherein a likelihood greater than a threshold likelihood is indicative of a person detection. Additionally, the processor further configured to increment an entry count of the period of time for each distinct person detected. Additionally, the processor further configured to determine a corrected entry count for the period of time by, without manual input from a user, removing ghost detection counts and adding missed detection counts. Additionally, the processor further configured to store the corrected entry count in a database.

Another example implementation includes an apparatus for detecting persons entering an environment, comprising means for detecting, using a plurality of image frames from a first sensor, persons that enter the environment during a period of time by: identifying objects in the plurality of image frames captured by the first sensor during the period of time; and determining, for each respective object, a likelihood that the respective object is a person, wherein a likelihood greater than a threshold likelihood is indicative of a person detection. Additionally, the apparatus further includes means for incrementing an entry count of the period of time for each distinct person detected. Additionally, the apparatus further includes means for determining a corrected entry count for the period of time by, without manual input from a user, removing ghost detection counts and adding missed detection counts. Additionally, the apparatus further includes means for storing the corrected entry count in a database.

Another example implementation includes a computer-readable medium storing instructions for detecting persons entering an environment, executable by a processor to detect, using a plurality of image frames from a first sensor, persons that enter the environment during a period of time by. The instructions are further executable to identify objects in the plurality of image frames captured by the first sensor during the period of time. Additionally, the instructions are further executable to determine, for each respective object, a likelihood that the respective object is a person, wherein a likelihood greater than a threshold likelihood is indicative of a person detection. Additionally, the instructions are further executable to increment an entry count of the period of time for each distinct person detected. Additionally, the instructions are further executable to determine a corrected entry count for the period of time by, without manual input from a user, removing ghost detection counts and adding missed detection counts. Additionally, the instructions are further executable to store the corrected entry count in a database.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 4 is a flowchart illustrating a method of detecting objects exiting an environment, in accordance with exemplary aspects of the present disclosure.

FIG. 5 is a flowchart illustrating a method of correcting an exit count, in accordance with exemplary aspects of the present disclosure.

FIG. 7 is a flowchart illustrating a method of identifying a ghost detection, in accordance with exemplary aspects of the present disclosure.

FIG. 8 is a flowchart illustrating a method of identifying a missed detection, in accordance with exemplary aspects of the present disclosure.

FIG. 9 is a flowchart illustrating a method of identifying a missed detection using multiple sensors, in accordance with exemplary aspects of the present disclosure.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure describes implementations of improving vision systems that include occupancy counting features. Vision systems often fail to provide accurate counts of objects due to object detection issues. To address these shortcomings, the present disclosure describes how to improve occupancy counts using historical object detection data.

Vision systems that are used for occupancy counting (e.g., foot traffic counting systems) rely on accurate counts of persons and accurate identification of the time when those persons enter/leave an environment (e.g., an office). To achieve a favorable accuracy, the vision system may be periodically tuned. For example, the vision system may include a component that accepts feedback. This feedback may be described as "tuning," "training," "correction," or "calibration."

In some cases, the feedback involves the system receiving correction inputs from a user based on a manual review of entries or exits. For example, if a person is entering the environment and the vision system does not detect the person, the user may manually increase the entry count by one and may identify the undetected person. In one approach, the vision system may then adjust its object detection algorithm using this feedback such that the person is detected from then on. Although manual review is helpful, it is not always available, time efficient, or free from human error. The present disclosure thus describes systems and methods that reduce the amount of manual configuration required to achieve favorable accuracy, while saving cost and time to install and deploy the system. Said systems and methods specifically utilize historic error rates and secondary sensors to confirm exit and entry counts.

Figure 1:
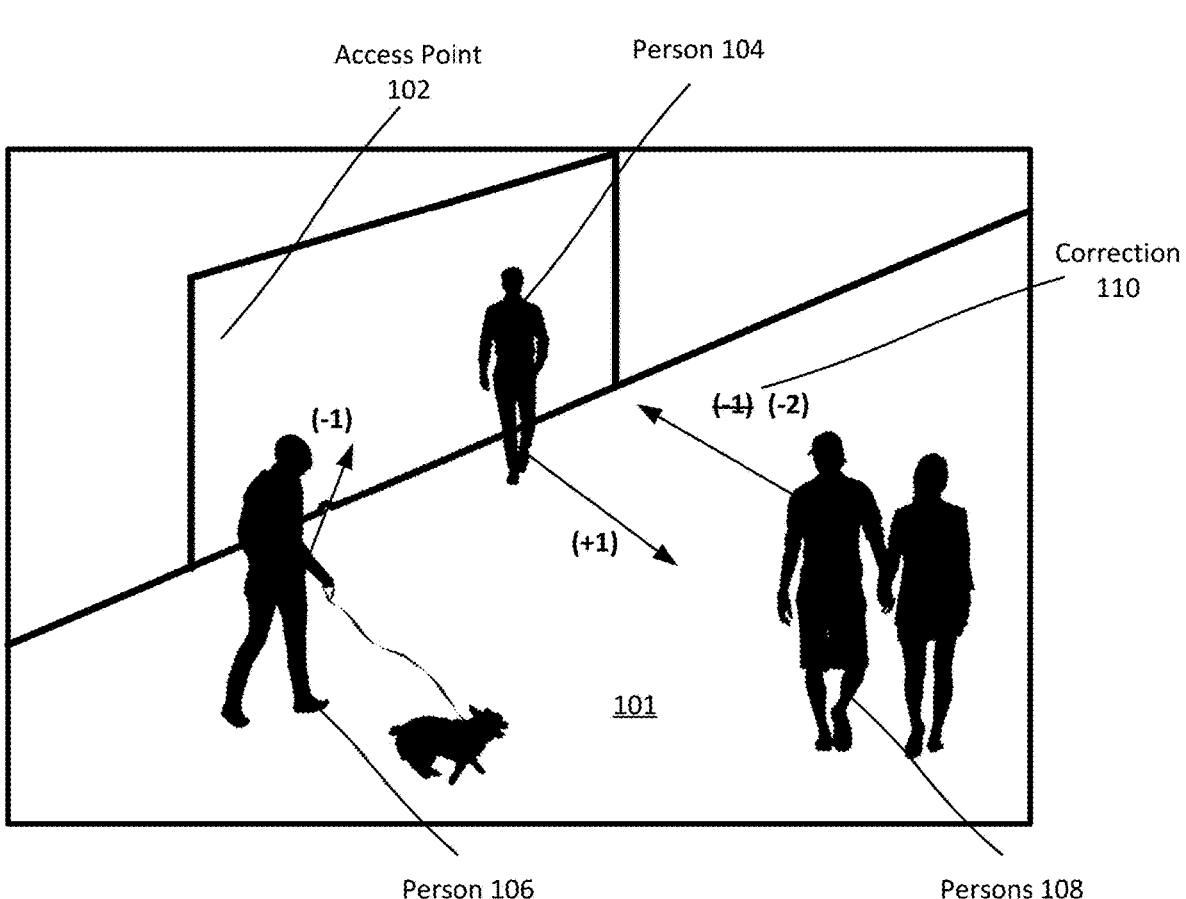
FIG. 1 is an example image frame captured by a camera used to detect objects in an environment, in accordance with exemplary aspects of the present disclosure.

FIG. 1 is an example image frame 100 captured by a camera used to detect objects in an environment 101, such as to monitor occupancy of the environment 101, in accordance with exemplary aspects of the present disclosure. The environment 101 may be indoors or outdoors. Access point 102 may be an entry and exit point of the environment 101. For example, access point 102 is a door or a gate or an opening to an area or any defined real or virtual boundary. Persons 104, 106, and 108 may enter and exit the environment 101 via the access point 102. Their entry and exits may be captured by different sensors present in the environment 101. One sensor may be the camera that captured image frame 100. Other example sensors may be a depth sensor, a laser detector, an IR sensor, a video camera, etc. Using any combination of sensors and computer vision techniques (e.g. facial detection, segmentation, edge detection, object detection, etc.), an occupancy counting system may determine how many people have entered and exited the environment 101. For example, a visual boundary including the access point 102 may be generated in the image frame. Depending on the trajectory of each detected person relative to the access point 102 and/or the environment 101, the system may increment an entry/exit count for detected persons in the environment 101.

Figure 3:
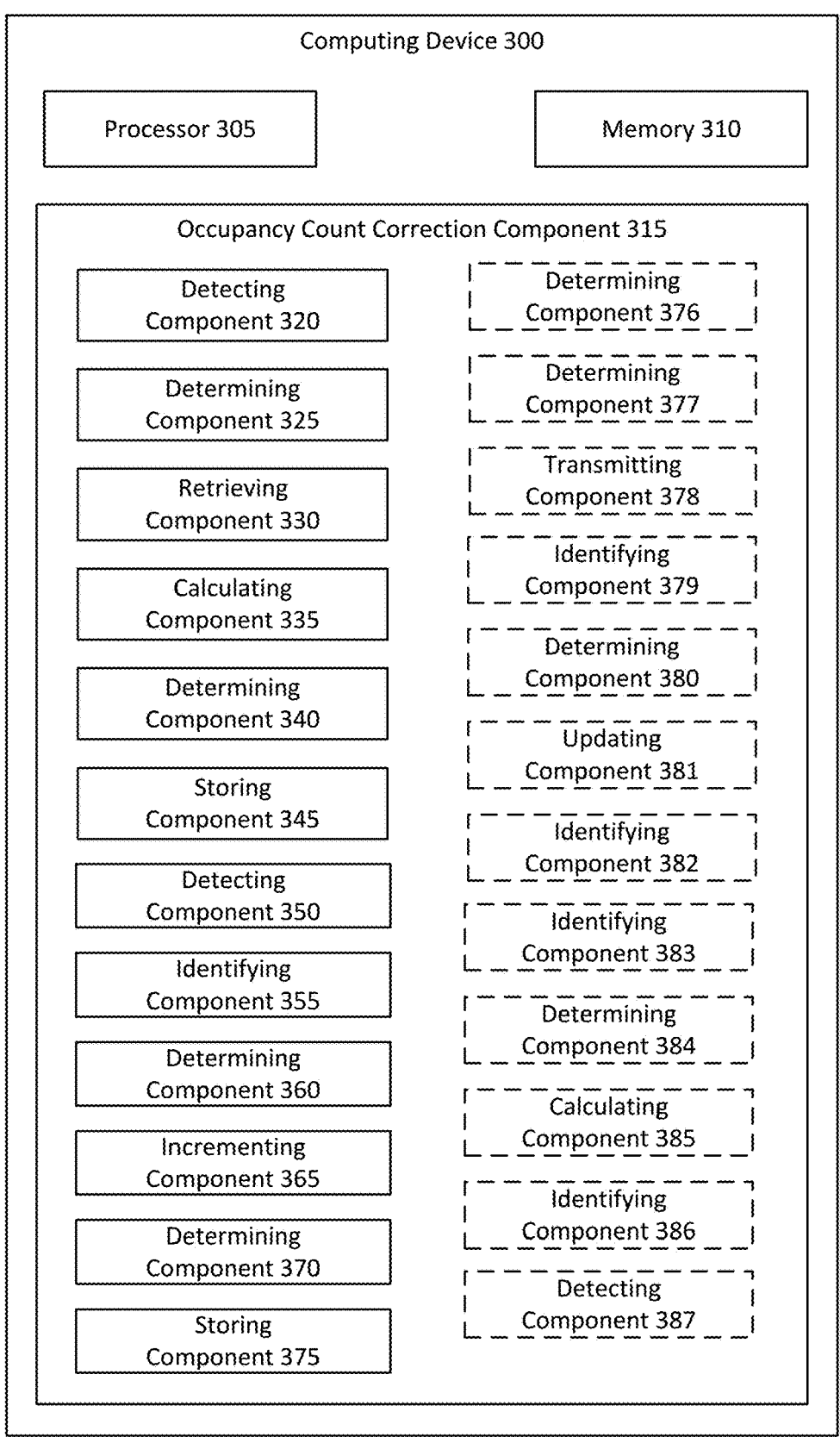
FIG. 3 is a block diagram of a computing device executing an occupancy count correction (OCC) component, in accordance with exemplary aspects of the present disclosure.

Suppose that person 104 enters the environment 101 via the access point 102. The occupancy counting system (see FIG. 3) may increment the occupancy count from 3 (including previously present person 106 and previously present persons 108) to 4. Suppose that person 106 then leaves the environment 101. The occupancy counting system may then decrease the occupancy count back to 3. As previously explained, certain entries and exits may be missed. For example, persons 108 may exit the environment 101, which should account for two exits. However, the occupancy counting system/camera may not detect two people because of their close proximity (e.g., one person may block the view of the camera as persons 108 exit). The occupancy count correction (OCC) component 315 of the occupancy counting system described in FIG. 3 is configured to correct these issues. For example, the OCC component 315 may make correction 110 (subtracting 2 from the occupancy count) based on a previous day's error rate and/or ghost detections. Thus, the exit count would be 2 (instead of 1) and the occupancy count would be 1 (instead of 2). Historic exit/entry counts are useful because environments tend to have consistent average entry and exit counts (e.g., the same amount of employees, the same amount of shoppers, etc.) over a long period of time.

In some aspects, with this corrected information, the occupancy counting system may execute different commands depending on a goal set by an administrator. For example, if the administrator is seeking to limit the amount of entries to a maximum occupancy count, when the corrected occupancy count reaches the maximum occupancy count, the system may transmit an alert (e.g., generate and send an email or text message via a wired or wireless network) to the administrator or automatically prevent further entries (e.g., disable access point 102 access by activating a lock or deactivating entry motion detection if access point 102 are motion-detection-based). In other aspects, the administrator may seek to determine the amount of time people spend in the environment to determine an open/close schedule (e.g., close the store at 8:00 pm instead of 7:00 pm due to the high traffic at 6:45 pm).

The occupancy count at a given time is given by the difference in entry counts and exit counts. For example, if in a given time period five people enter and two people exit the environment 101, the occupancy counting system determines that the occupancy count is the previous occupancy count plus the difference. For instance, if the occupancy count was previously 0, the new occupancy count is three. Ideally, both the entry and exit counts are accurate. If even one of them is incorrect, the occupancy count is also incorrect.

As discussed previously, there are many reasons why the entry and exit counts may be incorrect. Occupancy counting solutions without a means for error correction will suffer from accumulated accuracy loss over time. The presented aspects of real-time occupancy counting corrections using the described approach is unique. Observed typical prior approaches either utilize correlation with hardware devices or do not provide a real-time and active learning approach proposed by the present disclosure.

Figure 2:
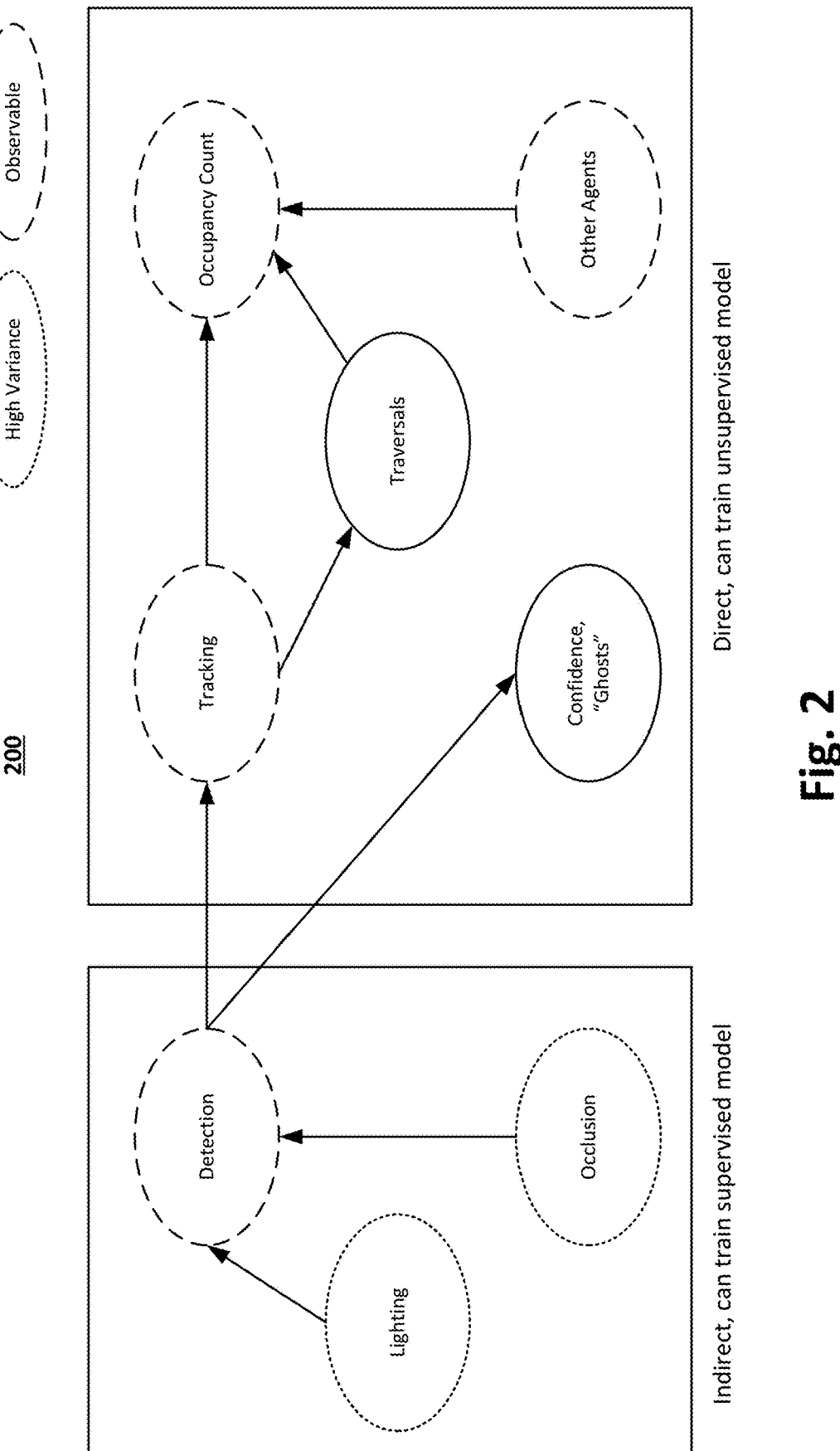
FIG. 2 is a diagram depicting a flow map for occupancy count correction, in accordance with exemplary aspects of the present disclosure.

FIG. 2 is a diagram depicting flow map 200 for occupancy count correction, in accordance with exemplary aspects of the present disclosure.

In the present disclosure, a combination of supervised and unsupervised machine leaning is used. Supervised machine learning is used to train a model of error rates in detection based on the environmental factors that primarily contribute to errors (e.g., lighting, occlusion, etc.). As indicated in FIG. 2, lighting and occlusion have high variance that can contribute to errors. For example, a person may be blocked by any other object (including another person) and not get counted. Likewise, a light such as a gleam from the sun may obscure a portion of a frame from where the person can be spotted, causing the person to not get counted. This makes detection difficult for conventional counting systems. In FIG. 2, detection, tracking, occupancy count and other agents are identified as observable because they are measurable data provided by the existing computer vision system (e.g., person presence likelihood can be measured, their movements can be measured, the amount of persons in an environment can be measured, and other data points from other agents can be measured).

Unsupervised machine learning is used to train general models based on features directly dependent on error processes (i.e., aspects of the machine learning components which produce count errors). For entry and exit, simply identifying a person in a frame is not enough because the person may be standing idle in an egress/ingress point. This makes tracking the person and their traversal important. Because there are multiple frames in which the person will be seen, tracking is made possible by analyzing changes in location across a plurality of frames. In addition, ghost detections can be identified (i.e., a non-person is detected as a person for a less than a threshold number of frames). Based on the detection and tracking of a person, an occupancy count is updated.

In some aspects, additional agents may be used to confirm the occupancy count. For example, if a sensor (e.g., a camera elsewhere in the environment) observes a person when the entry counter has not, the vision system may determine that the entry counter has recently missed a person entering the environment. All this data can later be used to automatically calibrate a specific instance of an environment when the similar data is observed again. Other agents may also include sensors such as biometric scanners, thermal sensors, ID badge readers, etc. For example, if a person scans their badge to enter an office environment, the true occupancy count may be at least one. If the camera fails to detect and track the person and the entry counter states that no one is in the office environment, this may be identified as a misclassification by the entry counter by the OCC component.

FIG. 3 is a block diagram of computing device 300 executing an occupancy count correction (OCC) component 315, in accordance with exemplary aspects of the present disclosure. FIG. 4 is a flowchart illustrating method 400 of detecting objects exiting an environment, in accordance with exemplary aspects of the present disclosure. Referring to FIG. 3 and FIG. 4, in operation, computing device 300 may perform method 400 of correcting an exit count in an environment via execution of OCC component 315 by processor 305 and/or memory 310.

At block 402, the method 400 includes detecting, using a plurality of image frames from at least one sensor, persons that exited the environment during a first period of time. For example, in an aspect, computing device 300, processor 305, memory 310, OCC component 315, and/or detecting component 320 may be configured to or may comprise means for detecting, using a plurality of image frames (e.g., image frame 100) from at least one sensor (e.g., a camera), persons that exited the environment during a first period of time (e.g., between 1:00 pm and 2:00 pm on Monday). Detecting component 320 may include an object detection/tracking algorithm.

For example, the detecting at block 402 may include identifying a first set of pixels that depict a person in a first frame. Detecting component 320 may monitor the plurality of image frames for additional sets of pixels that match the person of the first set of pixels. In response to identifying the additional sets of pixels, detecting component 320 may determine the relative location of each set of pixels in its respective frame. By determining a plurality of relative locations, detecting component 320 tracks the movement of a given person across a plurality of image frames. If the movement matches a trajectory that indicates an exit from the environment (i.e., a trajectory towards and outside a door), detecting component 320 determines that the given person has exited the environment.

At block 404, the method 400 includes determining an exit count for the first period of time. For example, in an aspect, computing device 300, processor 305, memory 310, OCC component 315, and/or determining component 325 may be configured to or may comprise means for determining an exit count for the first period of time.

For example, for each person that has a movement that matches an exit trajectory, determining component 325 may increment an exit count. The period of time may be an hour, a set of hours, a day, a week, etc. For example, the first period of time may be an hour between 1:00 pm and 2:00 pm on a Monday. Determining component 325 may determine that the exit count for the first period of time is the amount of increments that occurred in the first period of time. For example, if the exit count was incremented by one, 100 times, the exit count for the first period of time is 100.

At block 406, the method 400 includes retrieving, from a database in a memory, historical egress data for a second period of time corresponding to the first period of time, wherein the historical egress data comprises a detected historic exit count and a corrected historic exit count of the environment. For example, in an aspect, computing device 300, processor 305, memory 310, OCC component 315, and/or retrieving component 330 may be configured to or may comprise means for retrieving, from a database in memory 310, historical egress data for a second period of time corresponding to the first period of time, wherein the historical egress data comprises a detected historic exit count and a corrected historic exit count of the environment.

In an aspect, the first period of time and the second period of time are at a same time of day across different days. For example, if the first period of time is 1:00 pm to 2:00 pm on a Monday, the second period of time may be 1:00 pm to 2:00 pm on a Friday. In an aspect, the different days are a same day across different weeks. For example, the second period of time may be 1:00 pm to 2:00 pm on a Monday from a prior week.

The database comprising historical egress data may be divided into a plurality of time periods. For each time period, there may be an exit count determined using the sensor and respective corrected exit count that is generated either manually, with the use of other sensors, or using statistics. An example data structure that holds historical egress data may be:

| Time Period | Exit Count | Corrected Exit Count |
|---|---|---|
| 1:00 pm-2:00 pm, Monday, Jan. 3, 2022 | 20 | 22 |
| 2:00 pm-3:00 pm, Monday, Jan. 3, 2022 | 19 | 20 |
| . . . | . . . | . . . |
| 1:00 pm-2:00 pm, Tuesday, Jan. 4, 2022 | 11 | 15 |
| . . . | . . . | . . . |
| 1:00 pm-2:00 pm, Monday, Jan. 10, 2022 | 17 | |

At block 408, the method 400 includes calculating an error rate for the second period of time based on a ratio of the detected historic exit count and the corrected historic exit count. For example, in an aspect, computing device 300, processor 305, memory 310, OCC component 315, and/or calculating component 335 may be configured to or may comprise means for calculating an error rate for the second period of time based on a ratio of the detected historic exit count and the corrected historic exit count.

Referring to the table above, for example, the first period of time may be 1:00 pm to 2:00 pm on Monday Jan. 10, 2022. Calculating component 335 may identify the second period of time as being Monday Jan. 3, 2022 between 1:00 pm and 2:00 pm. The error rate for the second period of time may be determined by the equation:

$$Error\ Rate = |(Corrected\_Exit\_Count - Exit\ Count)| / Exit\ Count$$

Accordingly, for the second period of time, the error rate is (15−11)/11=0.3636.

At block 410, the method 400 includes determining a corrected exit count for the first period of time by adjusting the exit count using the error rate. For example, in an aspect, computing device 300, processor 305, memory 310, OCC component 315, and/or determining component 340 may be configured to or may comprise means for determining a corrected exit count for the first period of time by adjusting the exit count using the error rate. For example, according to the error rate, about 36.36% of exits were missed by the exit counter (e.g., detecting component 320). Determining component 340 may thus calculate a value equal to 36.36% of the current exit count and add the value to the current exit count. For example, if the current exit count is 17, determining component 340 determines the corrected exit count as 23 (17+6; where the corrected exit count of 6 is based on (17*0.3636)).

At block 412, the method 400 includes storing the corrected exit count in the databas. For example, in an aspect, computing device 300, processor 305, memory 310, OCC component 315, and/or storing component 345 may be configured to or may comprise means for storing the corrected exit count in the database (e.g., in the field "corrected exit count").

It should be noted that the error rate is dependent on the second period of time. For example, the second period of time may be an entire day, entire week, or the total time that corrections have been entered into the database. Accordingly, the error rate may be a daily error rate, a weekly error rate, or a global error rate, or an error rate based on any configured time period.

In an optional or additional aspect, subsequent to block 410, the method 400 may further include transmitting an alert to a user indicating the corrected exit count. For example, in an aspect, computing device 300, processor 305, memory 310, OCC component 315, and/or transmitting component 378 may be configured to or may comprise means for transmitting an alert to a user indicating the corrected exit count. For example, transmitting component 378 may send a text, an email, and/or a custom message on a user interface for access by a user (e.g., a security officer).

Referring to FIG. 5, in an optional aspect, at block 502, the method 400 may further include determining an occupancy count of the environment during the first period of time, wherein the occupancy count is a difference between a total entry count and the exit count. For example, in an aspect, computing device 300, processor 305, memory 310, OCC component 315, and/or determining component 376 may be configured to or may comprise means for determining an occupancy count of the environment during the first period of time, wherein the occupancy count is a difference between a total entry count and a total exit count.

For example, the total number of entries till 1:00 pm may be 100 and the total number of exits may be 80. Accordingly, the occupancy count is determined to be 20 at 1:00 pm.

In this optional aspect, at block 504, the method 400 may further include determining whether the adjusting the exit count using the error rate will cause the occupancy count to become a negative value. For example, in an aspect, computing device 300, processor 305, memory 310, OCC component 315, and/or determining component 377 may be configured to or may comprise means for determining whether the adjusting the exit count using the error rate will cause the occupancy count to become a negative value.

Suppose that no new entries occurred in the environment after 1:00 pm and the occupancy count is 20. If the exit count between 1:00 pm and 2:00 pm is greater than 20 (after correction), the occupancy count would become a negative value. Because this is not physically possible, the correction is not valid.

In this optional aspect, at block 506, the method 400 may further include, in response to determining that the occupancy count will become a negative value, adjusting the exit count such that the occupancy count becomes zero. For example, if the corrected exit count is originally set to 21, upon determining that the occupancy count will become a negative value, the corrected exit count is adjusted to 20 (yielding an occupancy count of 0) by determining component 377.

Figure 6:
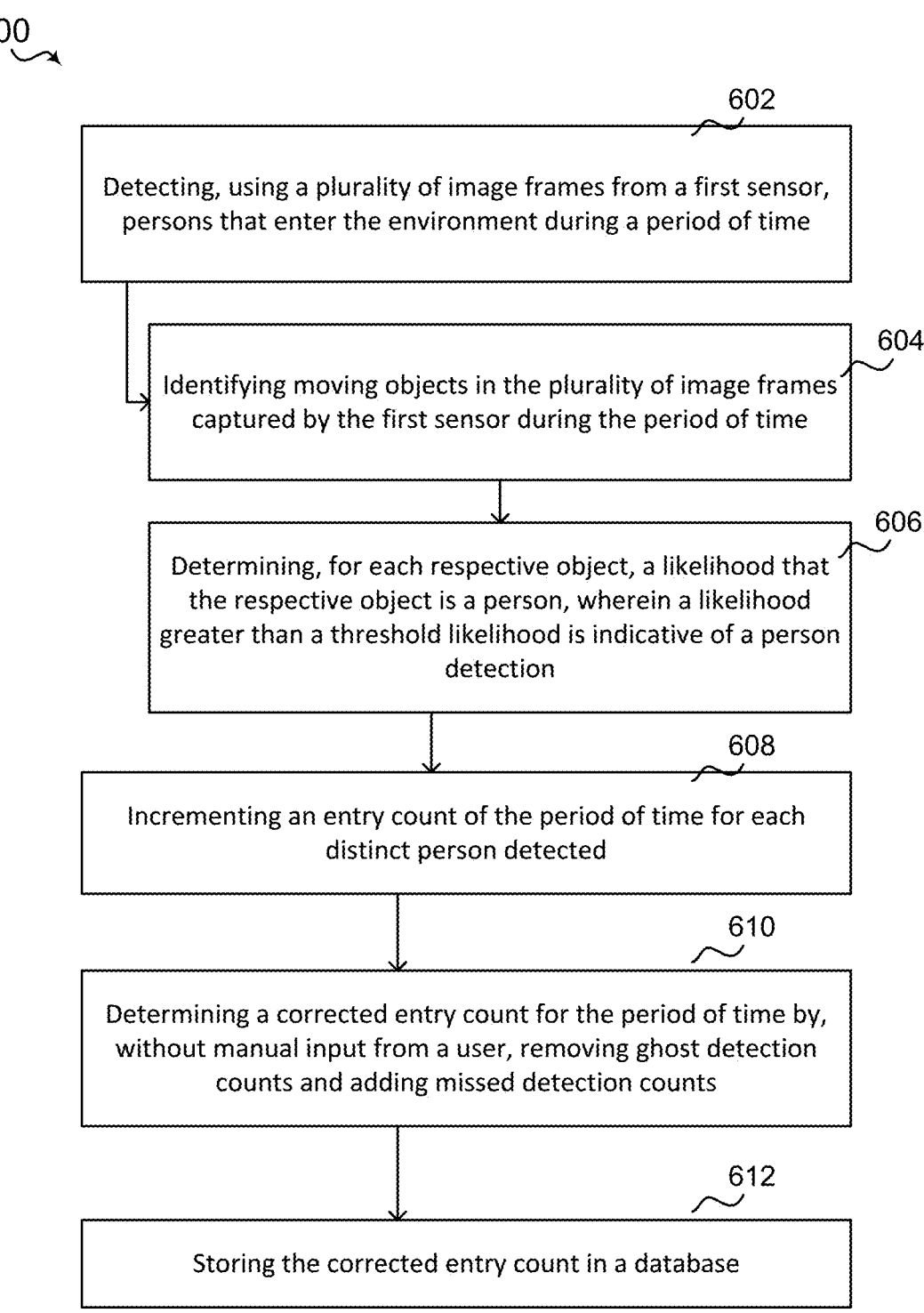
FIG. 6 is a flowchart illustrating a method of detecting objects entering an environment, in accordance with exemplary aspects of the present disclosure.

FIG. 6 is a flowchart illustrating method 600 of detecting objects entering an environment, in accordance with exemplary aspects of the present disclosure. Referring to FIG. 3 and FIG. 6, in operation, computing device 300 may perform method 600 of correcting an entry count in an environment via execution of OCC component 315 by processor 305 and/or memory 310.

At block 602, the method 600 includes detecting, using a plurality of image frames from a first sensor, persons that enter the environment during a period of time. For example, in an aspect, computing device 300, processor 305, memory 310, OCC component 315, and/or detecting component 350 may be configured to or may comprise means for detecting, using a plurality of image frames from a first sensor, persons that enter the environment during a period of time.

As described before, detecting component 350 may use computer vision techniques and object detection to identify persons in a frame and track the movement of the identified persons across a plurality of image frames. If the movement corresponds to a movement indicative of entering an environment, detecting component 350 may determine that an entry has occurred. Blocks 604 and 606 are detailed steps of detection.

At block 604, the method 600 includes identifying moving objects in the plurality of image frames captured by the first sensor during the period of time. For example, in an aspect, computing device 300, processor 305, memory 310, OCC component 315, and/or identifying component 355 may be configured to or may comprise means for identifying moving objects in the plurality of image frames captured by the first sensor during the period of time. In some aspects, the identified movements of the objects are particularly along a trajectory indicative of an entry into the environment.

At block 606, the method 600 includes determining, for each respective object, a likelihood that the respective object is a person, wherein a likelihood greater than a threshold likelihood is indicative of a person detection. For example, in an aspect, computing device 300, processor 305, memory 310, OCC component 315, and/or determining component 360 may be configured to or may comprise means for determining, for each respective object, a likelihood that the respective object is a person, wherein a likelihood greater than a threshold likelihood is indicative of a person detection. For example, determining component 360 assign a confidence score (e.g., 70%) that represents how close the object matches to a representation of a person. This confidence score is the likelihood. The threshold likelihood may be a predetermined value such as 75%. If the likelihood is greater than the threshold likelihood, determining component 360 determines that the moving object is a person.

In some aspects, the confidence score is built-in to the object classification model. For example, if a computer vision technique involves matching key points, the confidence score may be the amount of key points out of a total amount of key points that match between a sample image of a person and an input image. If machine learning is used, the confidence score may be given by the weighted value that is compared with a classification threshold. For example, in neural networks, the value of the final layer prior to binary classification is the confidence score.

At block 608, the method 600 includes incrementing an entry count of the period of time for each distinct person detected. For example, in an aspect, computing device 300, processor 305, memory 310, OCC component 315, and/or incrementing component 365 may be configured to or may comprise means for incrementing, an entry count of the period of time for each distinct person detected.

For example, for each person identified, OCC component 315 may assign a unique identifier that is used to track the person across a plurality of image frames. The unique identifier may be a distinct attribute of the person (e.g., a vector representation of the face of the person). Incrementing component 365 may track the person as he/she enters and exits a plurality of frames and increments the entry count when a complete entry motion is performed by the person (e.g., the person enters a door and is no longer visible in the plurality of image frames).

At block 610, the method 600 includes determining a corrected entry count for the period of time by, without manual input from a user, removing ghost detection counts and adding missed detection counts. For example, in an aspect, computing device 300, processor 305, memory 310, OCC component 315, and/or determining component 370 may be configured to or may comprise means for determining a corrected entry count for the period of time by, without manual input from a user, removing ghost detection counts and adding missed detection counts.

At times, detecting component 350 may increment the entry count when a person is not there or is not entering (i.e., a ghost detection). This is further discussed in FIG. 7. At times, detecting component 350 may not increment the entry count even though a person has entered the environment (i.e., a missed detection). This is further discussed in FIGS. 8 and 9.

In some aspects, subsequent to identifying the ghost detections and the missed detections, OCC component 315 may re-train an object detection model executed by detecting component 350. For example, OCC component 315 may retrieve frames with the ghost detections and classify them as non-persons and may retrieve frames with the missed detections and classify them as persons. These frames are added to a training dataset, that is used to improve the object detection model.

At block 612, the method 600 includes storing the corrected entry count in a database. For example, in an aspect, computing device 300, processor 305, memory 310, OCC component 315, and/or storing component 375 may be configured to or may comprise means for storing the corrected entry count in a database. In some aspects, transmitting component 378 may transmit an alert to the user indicating the corrected entry count.

FIG. 7 is a flowchart illustrating a method of identifying a ghost detection, in accordance with exemplary aspects of the present disclosure. Referring to FIG. 7, in an optional aspect, at block 702, the method 600 may further include identifying a set of consecutive image frames that have likelihoods indicative of at least one person and have a frame count equal to or greater than the threshold number of consecutive image frames. For example, in an aspect, computing device 300, processor 305, memory 310, OCC component 315, and/or identifying component 379 may be configured to or may comprise means for identifying a set of consecutive image frames that have likelihoods indicative of at least one person and have a frame count equal to or greater than the threshold number of consecutive image frames.

When a person moves in front of a camera, assuming that the person constantly remains in the line of sight of the camera, the person should appear in a consecutive set of image frames. If the person is walking behind obstructions, the person may appear in a few frames, then disappear behind the obstruction for a few frames, and then reappear in another set of frames. Entry detection may additionally evaluate whether the person appears in a threshold number of consecutive frames to classify their motion as an entry. If the person appears in too few frames (i.e., less than the threshold number), it is possible that the person did not enter the environment and was simply passing by (e.g., a ghost entry detection). In some cases, it is possible that the person is misclassified entirely and a person did not exist.

The threshold number of consecutive frames may be pre-determined. For example, if the camera captures 60 frames per second and it would physically take a person 3 seconds to enter the environment based on the view of the camera (e.g., walk across a foyer into a door in the view of the camera), then the person should appear in 180 consecutive frames. Accordingly, the threshold number may be set to 180. If this number is exceeded and the moving object is classified as a person, the entry is counted.

In this optional aspect, at block 704, the method 600 may further include determining that an object classified as a person in at least one of the set of consecutive image frames is not a person. For example, in an aspect, computing device 300, processor 305, memory 310, OCC component 315, and/or determining component 380 may be configured to or may comprise means for determining that an object classified as a person in at least one of the set of consecutive image frames is not a person.

For example, a second object detection model may be used to determine that the person in some of the frames is not a person at all. For example, the moving object may be a misclassified as a person due to obstructions or light conditions (e.g., gleam of sunlight).

In this optional aspect, at block 706, the method 600 may further include updating the frame count of the set of consecutive image frames by removing counts of objects that are not persons. For example, in an aspect, computing device 300, processor 305, memory 310, OCC component 315, and/or updating component 381 may be configured to or may comprise means for updating the frame count of the set of consecutive image frames by removing counts of objects that are not persons.

For example, updating component 381 may determine that the non-person object appears starting from the $30^{th}$ frame and continues to appear until the $60^{th}$ frame. If the "person" originally appeared in 200 frames, which is greater than the threshold number of 180, the new numbers of consecutive frame appears are 29 frames and 139 frames.

In this optional aspect, at block 708, the method 600 may further include identifying the ghost detection in response to determining that the updated frame count is less than the threshold number of consecutive image frames. For example, in an aspect, computing device 300, processor 305, memory 310, OCC component 315, and/or identifying component 382 may be configured to or may comprise means for identifying the ghost detection in response to determining that the updated frame count is less than the threshold number of consecutive image frames.

For example, because neither of the updated consecutive frame counts exceeds 180, identifying component 382 determines that a ghost detection has occurred.

FIG. 8 is a flowchart illustrating a method of identifying a missed detection, in accordance with exemplary aspects of the present disclosure. Referring to FIG. 8, in an optional aspect, at block 802, the method 600 may further include identifying a set of consecutive image frames that have likelihoods indicative of at least one person and have a frame count less than the threshold number of consecutive image frames. For example, in an aspect, computing device 300, processor 305, memory 310, OCC component 315, and/or identifying component 383 may be configured to or may comprise means for identifying a set of consecutive image frames that have likelihoods indicative of at least one person and have a frame count less than the threshold number of consecutive image frames.

For example, suppose that a person was detected in 30 consecutive frames and then 150 consecutive frames. Neither frame count exceeds the threshold number of consecutive image frames and therefore an entry count is not incremented. However, it is possible that for a certain set of frames, the line of sight between the camera and the person was simply blocked by an obstruction (e.g., another person).

In this optional aspect, at block 804, the method 600 may further include determining that a person identified in the set of consecutive image frames appears in non-consecutive image frames captured by the first sensor during the period of time. For example, in an aspect, computing device 300, processor 305, memory 310, OCC component 315, and/or determining component 384 may be configured to or may comprise means for determining that a person identified in the set of consecutive image frames appears in non-consecutive image frames captured by the first sensor during the period of time. For example, the initial set of consecutive image frames may be 30 and the additional set may be 150. These together are non-consecutive image frames with a total count of 180.

In this optional aspect, at block 806, the method 600 may further include calculating a sum of frame counts between the set of consecutive image frames and the non-consecutive image frames. For example, in an aspect, computing device 300, processor 305, memory 310, OCC component 315, and/or calculating component 385 may be configured to or may comprise means for calculating a sum of frame counts between the set of consecutive image frames and the non-consecutive image frames. For example, the initial set of consecutive image frames may be 30 and the additional set may be 150 (these are considered non-consecutive because they are not immediately after the initial set). The sum of both image frame sets is 180.

In this optional aspect, at block 808, the method 600 may further include identifying the missed detection in response to determining that the sum is not less than the threshold number of consecutive image frames. For example, in an aspect, computing device 300, processor 305, memory 310, OCC component 315, and/or identifying component 386 may be configured to or may comprise means for identifying the missed detection in response to determining that the sum is not less than the threshold number of consecutive image frames.

Originally, because the person did not appear in at least a threshold number of consecutive frames, the object detection model may fail to classify the person as entering the environment. However, a missed detection is identified when despite not appearing for consecutive image frames, the person appears in enough frames equal to the threshold number.

FIG. 9 is a flowchart illustrating a method of identifying a missed detection using multiple sensors, in accordance with exemplary aspects of the present disclosure. Referring to FIG. 9, in an optional aspect, at block 902, the method 600 may further include detecting, by the first sensor, a first amount of persons entering the environment during the period of time. For example, in an aspect, computing device 300, processor 305, memory 310, OCC component 315, and/or detecting component 350 may be configured to or may comprise means for detecting, by the first sensor, a first amount of persons entering the environment during the period of time. For example, the first sensor may be a camera and detecting component 350 may track objects using computer vision.

In this optional aspect, at block 904, the method 600 may further include detecting, by a second sensor of the at least one sensor, a second amount of persons in the environment during the period of time. For example, in an aspect, computing device 300, processor 305, memory 310, OCC component 315, and/or detecting component 387 may be configured to or may comprise means for detecting, by a second sensor of the at least one sensor, a second amount of persons in the environment during the period of time.

Suppose that the environment is an office and employees are entering during the period of time being observed. The second sensor may be a ID badge scanner that the employees need to interact with (e.g., swipe their ID) in order to enter. If there are 40 employees that swiped their badge, the entry count should be at least 40.

In this optional aspect, at block 906, the method 600 may further include identifying the missed detection in response to determining that the second amount of persons is greater than the first amount of persons. For example, in an aspect, computing device 300, processor 305, memory 310, OCC component 315, and/or identifying component 386 may be configured to or may comprise means for identifying the missed detection in response to determining that the second amount of persons is greater than the first amount of persons. For example, using the first sensor, only 38 people may have been detected entering the environment. Because the second sensor detected two more people in the example given, there is a discrepancy in the entry count. In this case, identifying component 386 determines that there are two missed detections.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A vision system for detecting objects moving in an environment, comprising:
   at least one sensor;
   at least one memory; and
   at least one hardware processor communicatively coupled with the at least one memory and the at least one sensor and configured, individually or in combination, to:
      detect, using the at least one sensor, objects that crossed a boundary of an environment during a first period of time;
      determine, for the first period of time, a count of objects that crossed the boundary in a first direction;
      retrieve, from a database in the memory, historical egress and ingress data for a second period of time corresponding to the first period of time, wherein the historical egress and ingress data comprises a detected historic count of crossings in the first direction and a corrected historic count of crossings in the first direction;
      calculate an error rate for the second period of time based on a ratio of the detected historic count and the corrected historic count;
      determine a corrected count for the first period of time by adjusting the count using the error rate; and
      store the corrected count in the database.

2. The vision system of claim 1, wherein the first direction is a direction for entering the environment, wherein the count is an entry count.

3. The vision system of claim 1, wherein the first direction is a direction for exiting the environment, wherein the count is an exit count.

4. The vision system of claim 3, wherein the processor is further configured to determine the corrected count by:
   determining an occupancy count of the environment during the first period of time, wherein the occupancy count is a difference between a total entry count and the exit count;
   determining whether the adjusting the exit count using the error rate will cause the occupancy count to become a negative value; and
   in response to determining that the occupancy count will become a negative value, adjusting the exit count such that the occupancy count becomes zero.

5. The vision system of claim 1, wherein the first period of time and the second period of time are at a same time of day across different days.

6. The vision system of claim 5, wherein the different days are a same day across different weeks.

7. The vision system of claim 1, wherein the processor is further configured to transmit an alert indicating the corrected count.

8. The vision system of claim 1, wherein the processor is further configured to:
   determine, for the first period of time, a count of objects that crossed the boundary in a second direction;
   retrieve, from the database in the memory, the historical egress and ingress data for the second period of time corresponding to the first period of time, wherein the historical egress and ingress data further comprises a detected historic count of crossings in the second direction and a corrected historic count of crossings in the second direction;

calculate another error rate for the second period of time based on a ratio of the detected historic count of crossings in the second direction and the corrected historic count of crossings in the second direction;
   determine another corrected count for the first period of time by adjusting, using the error rate, the count of objects that crossed the boundary in the second direction; and
   store the another corrected count in the database.

9. The vision system of claim 8, wherein the second direction is opposite to the first direction.

10. A method for detecting objects moving in an environment, comprising:
   detecting, using at least one sensor, objects that crossed a boundary of an environment during a first period of time;
   determining, for the first period of time, a count of objects that crossed the boundary in a first direction;
   retrieving, from a database in memory, historical egress and ingress data for a second period of time corresponding to the first period of time, wherein the historical egress and ingress data comprises a detected historic count of crossings in the first direction and a corrected historic count of crossings in the first direction;
   calculating an error rate for the second period of time based on a ratio of the detected historic count and the corrected historic count;
   determining a corrected count for the first period of time by adjusting the count using the error rate; and
   storing the corrected count in the database.

11. The method of claim 10, wherein the first direction is a direction for entering the environment, wherein the count is an entry count.

12. The method of claim 10, wherein the first direction is a direction for exiting the environment, wherein the count is an exit count.

13. The method of claim 12, wherein determining the corrected count comprises:
   determining an occupancy count of the environment during the first period of time, wherein the occupancy count is a difference between a total entry count and the exit count;
   determining whether the adjusting the exit count using the error rate will cause the occupancy count to become a negative value; and
   in response to determining that the occupancy count will become a negative value, adjusting the exit count such that the occupancy count becomes zero.

14. The method of claim 10, wherein the first period of time and the second period of time are at a same time of day across different days.

15. The method of claim 14, wherein the different days are a same day across different weeks.

16. The method of claim 10, further comprising transmitting an alert indicating the corrected count.

17. The method of claim 10, further comprising:
   determining, for the first period of time, a count of objects that crossed the boundary in a second direction;
   retrieving, from the database in the memory, the historical egress and ingress data for the second period of time corresponding to the first period of time, wherein the historical egress and ingress data further comprises a detected historic count of crossings in the second direction and a corrected historic count of crossings in the second direction;

calculating another error rate for the second period of time based on a ratio of the detected historic count of crossings in the second direction and the corrected historic count of crossings in the second direction;

determining another corrected count for the first period of time by adjusting, using the error rate, the count of objects that crossed the boundary in the second direction; and storing the another corrected count in the database.

18. The method of claim 17, wherein the second direction is opposite to the first direction.

19. A non-transitory computer-readable medium storing instructions for detecting objects moving in an environment, executable by a processor to:

detect, using at least one sensor, objects that crossed a boundary of an environment during a first period of time;

determine, for the first period of time, a count of objects that crossed the boundary in a first direction;

retrieve, from a database, historical egress and ingress data for a second period of time corresponding to the first period of time, wherein the historical egress and ingress data comprises a detected historic count of crossings in the first direction and a corrected historic count of crossings in the first direction;

calculate an error rate for the second period of time based on a ratio of the detected historic count and the corrected historic count;

determine a corrected count for the first period of time by adjusting the count using the error rate; and store the corrected count in the database.

20. The non-transitory computer-readable medium of claim 19, wherein the first direction is a direction for entering the environment, wherein the count is an entry count.

\* \* \* \* \*